United States Patent
Liebetruth et al.

(10) Patent No.: US 6,252,186 B1
(45) Date of Patent: Jun. 26, 2001

(54) INSERTABLE AND RETRACTABLE SWITCHING DEVICE COMPRISING A BLOCKING BAR WHICH PREVENTS WRONG OPERATION

(75) Inventors: Marc Liebetruth, Glienicke; Torsten Ahlert, Fürstenwalde; Ludvik Godesa, Berlin; Jörg-Uwe Dahl, Werder, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,209

(22) PCT Filed: Jun. 8, 1999

(86) PCT No.: PCT/DE99/01710

§ 371 Date: May 5, 2000

§ 102(e) Date: May 5, 2000

(87) PCT Pub. No.: WO99/65124

PCT Pub. Date: Dec. 16, 1999

(30) Foreign Application Priority Data

Jun. 10, 1998 (DE) .............................. 198 26 200

(51) Int. Cl.⁷ .................................................. H01H 9/20
(52) U.S. Cl. .................................. 200/43.01; 200/50.21; 200/50.26; 200/400; 200/308; 200/318
(58) Field of Search ............................. 200/17 B, 43.01, 200/43.11–43.18, 50.01, 50.21, 50.23, 50.24, 50.26, 400, 401, 500, 501, 308, 318, 321, 322, 323, 324; 361/605–610, 615, 618, 619

(56) References Cited

U.S. PATENT DOCUMENTS

| | | | |
|---|---|---|---|
| 5,337,210 | * | 8/1994 | Ishikawa et al. .................... 361/608 |
| 5,945,648 | * | 8/1999 | M'Sadoques ...................... 200/43.14 |
| 6,080,947 | * | 6/2000 | Ulerich et al. ...................... 200/308 |
| 6,144,002 | * | 11/2000 | Coudert et al. ...................... 200/400 |

FOREIGN PATENT DOCUMENTS

| | | | |
|---|---|---|---|
| 43 33 828 | 3/1995 | (DE) | ............................... H01H/3/30 |
| 44 20 580 | 11/1995 | (DE) | ........................... H02B/11/133 |
| 44 20 581 | 11/1995 | (DE) | ........................... H02B/11/133 |
| 42 11 421 | 2/1997 | (DE) | ........................... H02B/11/127 |
| 0 226 532 | 6/1987 | (EP) | ............................. G02B/11/12 |

\* cited by examiner

Primary Examiner—Michael Friedhofer
(74) Attorney, Agent, or Firm—Kenyon & Kenyon

(57) ABSTRACT

A switching device has a closing device and a traversing mechanism for insertion and retraction relative to an insertion frame, where the said devices can be operated only in the OFF state of the switching device. A blocking bar having a cam element that cooperates with a carrier of an OFF operator is guided by elongated holes behind an operator's console of the switching device. The carrier and the cam element work together in such a way that the OFF operator can be pulled inward when the blocking bar is operated, thus signaling to the user that the switching device is locked in the OFF state.

5 Claims, 4 Drawing Sheets

INSERTABLE AND RETRACTABLE SWITCHING DEVICE COMPRISING A BLOCKING BAR WHICH PREVENTS WRONG OPERATION

FIELD OF THE INVENTION

The present invention relates to a switching device having an operating shaft for moving a switching contact arrangement into its ON and OFF switch positions. The switching device further includes an indicator element for the switch positions and a linearly displaceably guided blocking bar which is provided as protection against wrong operation and has working faces for cooperating with the indicator element. The switching device also includes a closing device for locking the switching device in the OFF position, having an OFF operator and a protective device for securing access to a traversing mechanism of the switching device.

BACKGROUND INFORMATION

A switching device of the type described above is described in German Patent No. 44 20 580. Access of a tool to the traversing mechanism here can be blocked by a protective device which can be operated as a function of the position of the blocking bar, where one of the working faces of the blocking bar can be covered by an opposing face of the indicator element which depends on the position of the operating shaft. This arrangement requires two-handed operation on the part of the user. First, the OFF key must be depressed before the protective device assigned to the traversing mechanism is opened or the closing device can be operated.

SUMMARY

An the object of the present invention is to implement the safety device which establishes the relationship between the OFF operator and the devices for insertion and retraction and for closing the switching device by means of a simple forced-action device. This device should have a forced action and should be operated without any auxiliary power. It should be easy to install in a space-saving manner with easy operation.

This object is achieved according to the present invention by the fact that the blocking bar has a cam element, and the OFF operator which is designed as a key has a carrier which cooperates with the cam element in such a way that the OFF operator can be moved into its effective position by a displacement of the blocking bar.

This achieves the result that any displacement of the blocking bar corresponding to the OFF switch position of the switching device at the same time necessarily moves the OFF operator into its active position, i.e., the OFF position. This not only frees the user from having to operate the OFF operator separately, as was necessary in the past, but also permanently displays the special operating state of the switching device. Any other person working with the switching device will thus immediately recognize the operating state of the switching device on the basis of the position of the OFF operator and need not operate the OFF operator on a trial basis as was necessary in the past.

For the purpose of the present invention, OFF operators having a key that has eccentrically arranged swivel pins and is designed like a rocker are particularly suitable. This design thus facilitates twist-free insertion by using the cam element. However, the present invention can also be used in combination with traditional parallel guided pushbuttons if twist-free guidance is ensured. In both cases, it may be desirable for the cam element to be designed like a fork for symmetrical entrainment of the OFF operator in order to avoid increased friction due to twisting or jamming of the key of the OFF button.

The basic system of an ON and OFF limit switch is described in detail in German Patent No. 43 33 828 and German Patent No. 44 20 580, and therefore need not be explained again further here.

With proper functioning of the switching device, a reliable correlation between the position of the OFF operator and the switching contact arrangement can be assumed. In the case of a serious disturbance, e.g., contact welding, however, the switching contact arrangement can be closed when the OFF operator is depressed. However, because of the rigid mechanical coupling of the switching contact arrangement having the operating shaft, the indicator element also remains in the ON position and thus blocks any displacement of the blocking bar. Again in this case, access to the traversing mechanism is impossible with the device according to the present invention and the closing operation cannot be activated either. Thus, the isolator condition, as it is called, is ensured. Access to the traversing mechanism may be designed as a "portal" in a conventional way (see, e.g., German Patent No. 44 20 581). Then the OFF key returns to the normal position automatically or only after the "portal" has been closed depending on whether or not the "portal" has a bias tension in the closed position.

DETAILED DESCRIPTION

Figure 1:
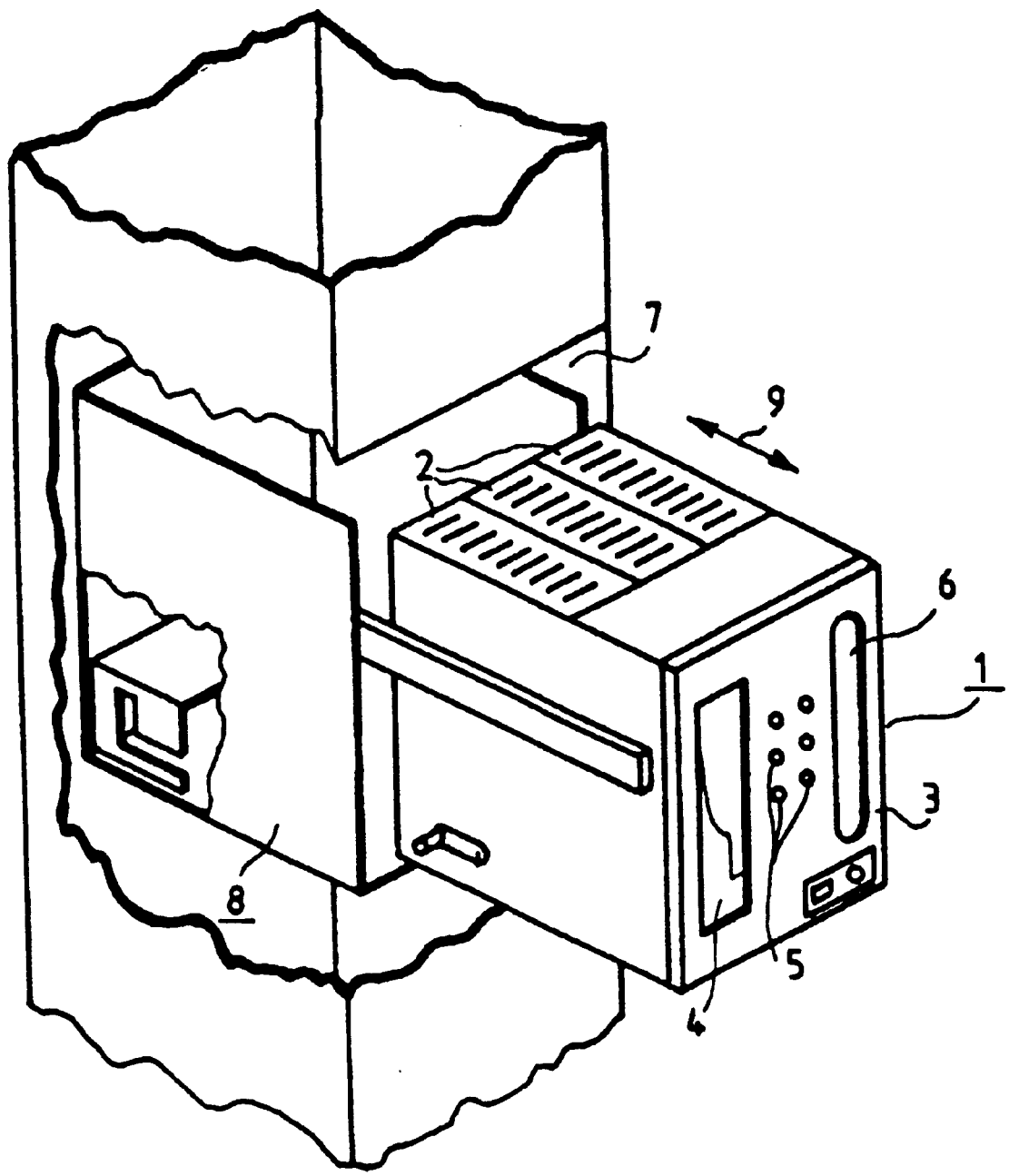
FIG. 1 shows schematically a perspective view of a low-voltage circuit-breaker having an insertion frame and parts of a switchgear or a switching station.

Switching device 1 shown in FIG. 1 is a low-voltage circuit-breaker having arc quenching chambers 2 whose outlet orifices are arranged at the top. An operator's console 3 at the front has the operating field of an electronic overcurrent trip 4 on the left side, operating and indicator elements 5 in the middle, including an OFF operator 15 of switching device 1, and a hand lever 6 on the right side for loading a spring. Switching device 1 is inserted into a switchgear cubicle 7 of a switchgear cabinet (shown cutaway) or a switching station with multiple fields, where there is an insertion frame 8, and it can be inserted and retracted by a traversing mechanism (12 in FIG. 2) in the direction of double arrow 9. Switching device 1 can be closed by a closing device (11 in FIG. 2) to ensure that it cannot be operated in error or misused. At the same time, traversing mechanism 12 must be locked, which is expediently accomplished by preventing insertion of a crank which is provided as a tool by a protective device (13 in FIG. 2).

Figure 2:
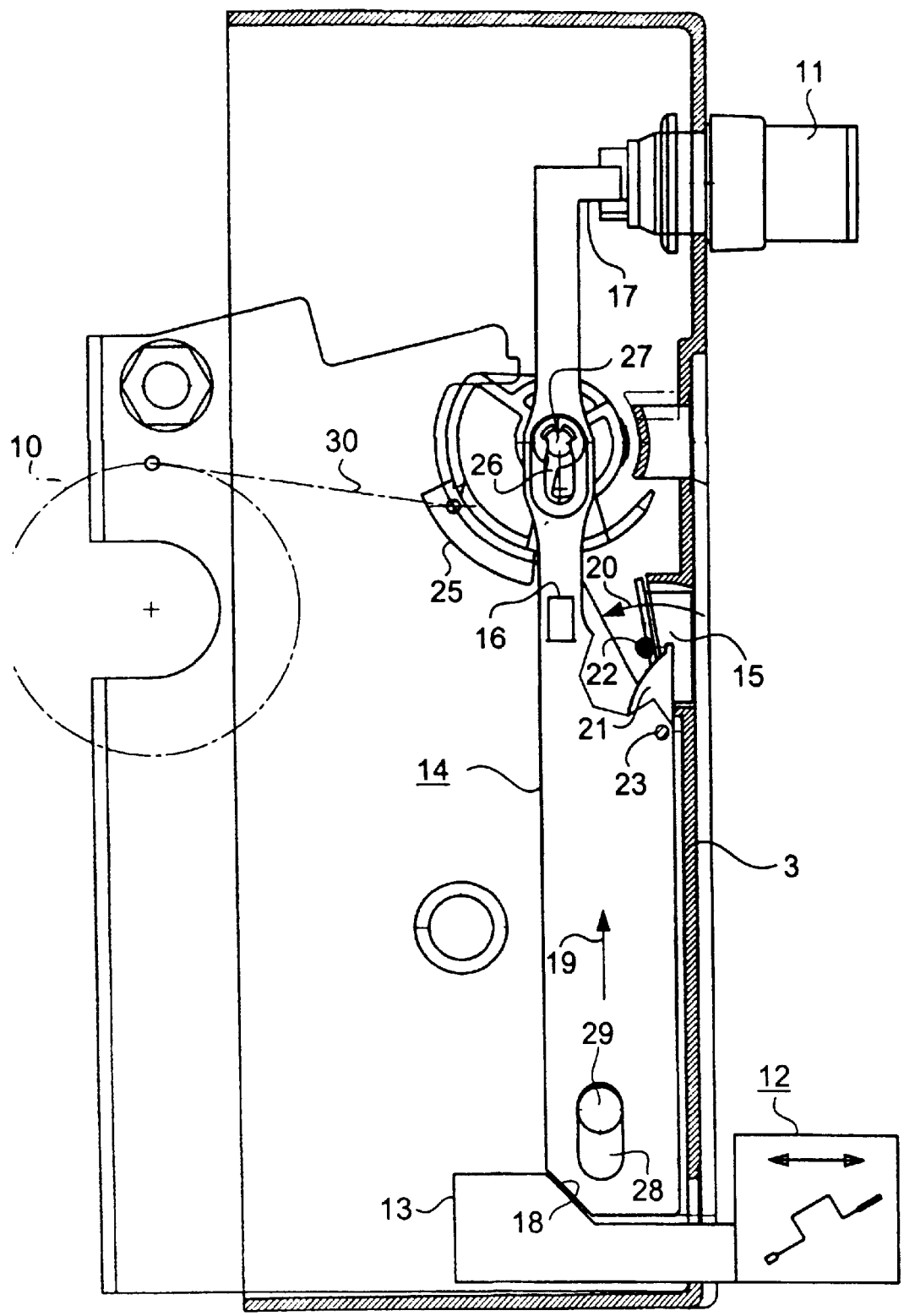
FIG. 2 shows a section through the front area of the low-voltage circuit-breaker having a blocking bar and components of the circuit-breaker (which is in the OFF position) that work together with the blocking bar.

FIG. 2 shows a blocking bar 14, which is guided to be displaceable vertically and in a straight line, in the unoperated state in the "OFF" position of the switch behind the operator's console 3 of switching device 1. This switch position is signaled to a user by an indicator element 24 which is connected by a coupling rod 30 (indicated with dash-dot lines) to an operating shaft 10 which is provided for operation of switching contacts of switching device 1. Indicator element 24 is arranged on a bearing pin 27 so it can rotate and it has an opposing face 25 arranged concentrically with bearing pin 27 and opposite a working face 16 of blocking bar 14. The desired interaction between working face 16 and opposing face 25 is necessarily ensured by the fact that blocking bar 14 has an elongated hole 26 for guidance, with bearing pin 27 of indicator element 24 passing through it. A second elongated hole 28 is provided at the lower end of blocking bar 14 and is used for guidance on a guide pin 29.

At the upper end, blocking bar 14 is also provided with a working face 17 that cooperates with closing device 11 and with a working face 18 on the lower end, which in turn cooperates with protective device 13 of traversing mechanism 12. A cam element 21 functions as another working face of blocking bar 14 and cooperates with an OFF operator 15 which is designed as a pushbutton in a manner yet to be described. OFF operator 15 is designed like a rocker and has carriers 22 and eccentrically arranged swivel pins 23.

Figure 3:
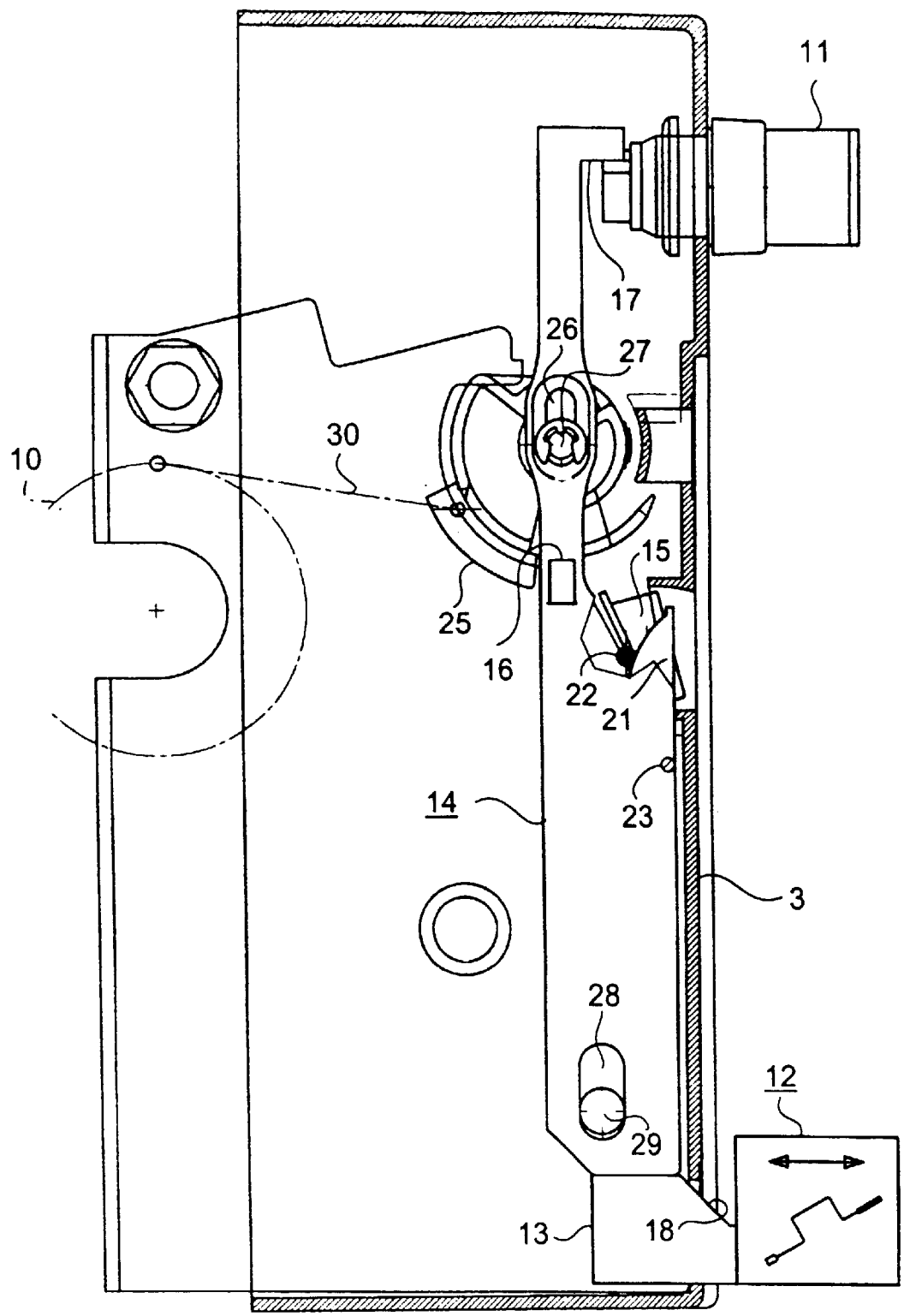
FIG. 3 shows the blocking bar in its operated position, this figure corresponding to FIG. 2 when the switching device is in the OFF position.

As also shown in greater detail in FIG. 2, carriers 22 are opposite cam elements 21 which are preferably arranged symmetrically like a fork so that a displacement of blocking bar 14 in the direction of an arrow 19 causes swiveling of OFF operator 15 about its swivel pin 23 in the direction of an arrow 20. In the end position of this operation, the arrangement according to FIG. 2 is shown in FIG. 3. The displacement of blocking bar 14 in the direction of arrow 19 can be accomplished in particular by working face 17 through closing device 11 or by working face 18 through a displacement of protective device 13 for the purpose of operation of traversing mechanism 12.

Figure 4:
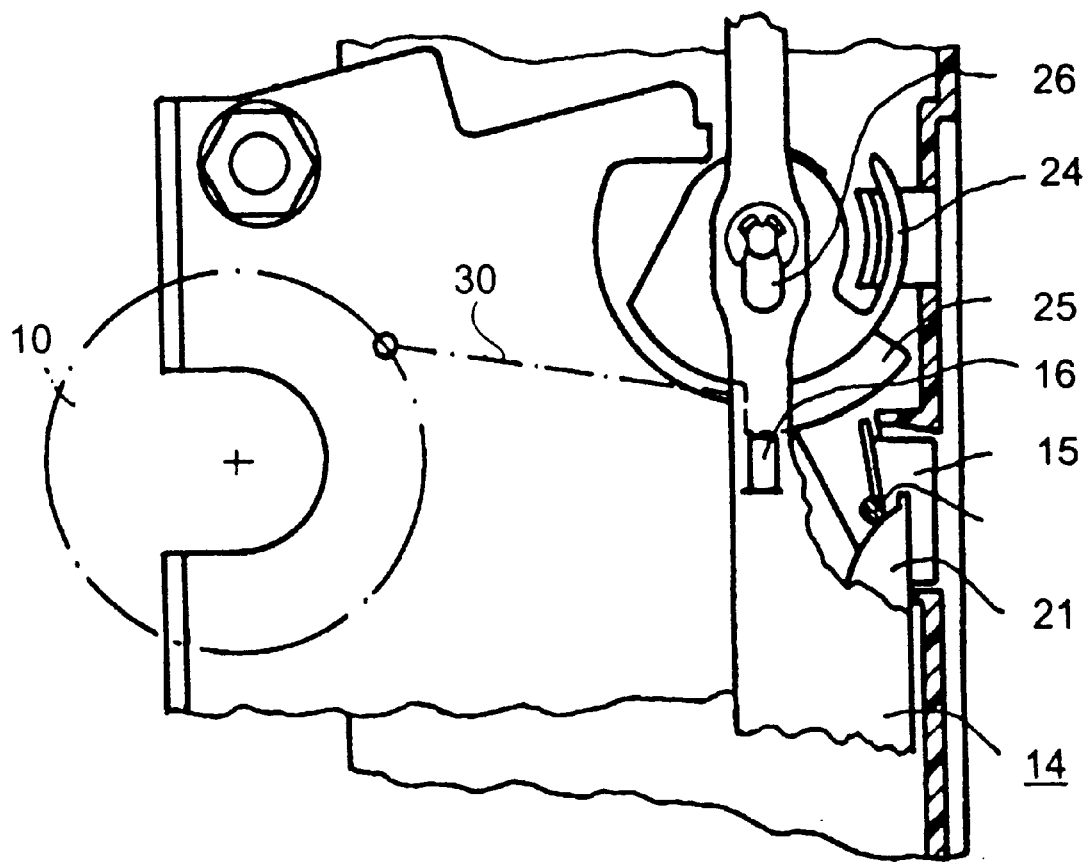
FIG. 4 shows the blocking bar in an attempt at operation when the switching device is in the ON position, this figure corresponding to FIG. 3, but limited to the area of the indicator element.

FIG. 4 shows the state when switching device 1 is in the ON switch position and an attempt has been made to operate closing device 11 or protective device 13. In this state, indicator element 24 is rotated by its coupling with operating shaft 10 with respect to its position shown in FIGS. 2 and 3 such that opposing face 25, which is on the periphery of indicator element 24 is opposite working face 16 of blocking bar 14. In an attempt to operate closing device 11, working face 16 strikes opposing face 25 after running through a slight windup. Blocking bar 14 thus cannot be brought into the position according to FIG. 3. This also prevents protective device 13 from assuming the position shown in FIG. 3. Thus, there is no access to traversing mechanism 12.

What is claimed is:

1. A switching device, comprising:
    an operating shaft for moving a switch contact arrangement into an ON position and an OFF position;
    an indicator element providing an indication of a position of the switch contact arrangement;
    a linearly displaceably guided blocking bar for protecting against improper operation of the switching device, the blocking bar having working faces cooperating with the indicator element, the blocking bar including a cam element;
    a closing device for locking the switching device in the OFF position; and
    an OFF operator and a protective device for securing access to a traversing mechanism of the switching device, the OFF operator being designed as a key and includes a carrier which cooperates with the cam element so that the OFF operator is moved in an effective position by a displacement of the blocking bar.

2. The switching device according to claim 1, wherein the key is provided with eccentrically arranged swivel pins and is designed as a rocker.

3. The switching device according to claim 1, wherein the key is a parallel displaceable button.

4. The switching device according to claim 1, wherein the cam element is a fork for symmetrical entrainment of the OFF operator.

5. The switching device according to claim 1, further comprising:
    a bearing pin forming an axis of rotation of the indicator element, the blocking bar being displaceably guided by an elongated hole on the bearing pin.

* * * * *